(12) United States Patent
Tsai et al.

(10) Patent No.: US 12,273,014 B2
(45) Date of Patent: Apr. 8, 2025

(54) MOTOR

(71) Applicant: Delta Electronics, Inc., Taoyuan (TW)

(72) Inventors: Cheng-Hsun Tsai, Taoyuan (TW);
Che-Wei Shih, Taoyuan (TW);
Guo-Han Tseng, Taoyuan (TW);
Shang-Mao Tsai, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 273 days.

(21) Appl. No.: 17/948,987

(22) Filed: Sep. 20, 2022

(65) Prior Publication Data

US 2023/0327517 A1 Oct. 12, 2023

(30) Foreign Application Priority Data

Apr. 6, 2022 (CN) .......................... 202220768153.0

(51) Int. Cl.
*H02K 9/06* (2006.01)

(52) U.S. Cl.
CPC ...................................... *H02K 9/06* (2013.01)

(58) Field of Classification Search
CPC ....................................................... H02K 9/06
See application file for complete search history.

(56) References Cited

U.S. PATENT DOCUMENTS

| | | | |
|---|---|---|---|
| 7,874,796 B2 | 1/2011 | Chang et al. | |
| 9,388,824 B2 * | 7/2016 | Yin | F04D 25/0646 |
| 9,651,054 B2 * | 5/2017 | Chang | F04D 25/0613 |
| 10,138,895 B2 * | 11/2018 | Cheng | F04D 29/4226 |
| 10,544,790 B2 | 1/2020 | Horng et al. | |
| 2007/0286720 A1 * | 12/2007 | Chang | F04D 19/007 |
| | | | 415/198.1 |
| 2015/0167682 A1 * | 6/2015 | Ishihara | F04D 25/0686 |
| | | | 417/354 |
| 2016/0102672 A1 * | 4/2016 | Liu | F16C 32/0427 |
| | | | 417/423.12 |
| 2021/0044175 A1 * | 2/2021 | Chang | F04D 25/0613 |

FOREIGN PATENT DOCUMENTS

| | | |
|---|---|---|
| CN | 112564408 A | 3/2021 |
| TW | 200503387 A | 1/2005 |

\* cited by examiner

*Primary Examiner* — Forrest M Phillips
(74) *Attorney, Agent, or Firm* — KIRTON McCONKIE; Evan R. Witt

(57) ABSTRACT

A motor includes a rotor and a stator. The rotor comprises a rotating shaft and an impeller. The impeller couples with the rotating shaft and has a hub. The hub has an outer surface, an inner surface, a plurality of first through holes and a plurality of second through holes. The first through holes are disposed nearer the rotating shaft than the second through holes. The stator comprises a silicon steel sheet and a bearing assembly. The silicon steel sheet has an annular portion and a plurality of protruding portions. The rotating shaft couples with the bearing assembly and penetrates within an inner hole of the annular portion. Each protruding portion is extended outward from the annular portion and has an extending length. The distance between the first through hole and the nearest second through hole is in a range of 0.3 to 1.2 times of the extending length.

14 Claims, 6 Drawing Sheets

MOTOR

CROSS-REFERENCE TO RELATED APPLICATION

This application claims priority to China Patent Application No. 202220768153.0, filed on Apr. 6, 2022. The entire contents of the above-mentioned applications are incorporated herein by reference for all purposes.

FIELD OF THE INVENTION

The present disclosure relates to a motor, and more particularly to a motor with a hub having double rows of through holes.

BACKGROUND OF THE INVENTION

The traditional motor usually generates a large amount of heat after operating for a period of time. Along with the increasing price competition pressure of current fans, when fans are used in some high speed or high ambient temperature, the coils and the bearings in the motor are often overheated, so as to affect the stability and service life of the overall product.

Since the problems of the overheating of the coils and the bearings are long-standing issues, in order to improve the thermal conductivity, hubs made of metal materials are usually used in the prior art to conduct the generated heat. For example, in some conventional technologies, an iron shell is used as the hub, and there are holes to be arranged on the iron shell hub to increase convection and heat dissipation. However, the hub made of metal material is not only expensive, but also has limited its convection and heat dissipation when the motor operates in high speed and generates high temperature. Moreover, in this prior art, in order to increase the heat dissipation efficiency, the hole diameters are relatively large, and when the motor is operating, dust can easily fall into the motor through these holes, result in affecting the performance of the motor.

Therefore, the hub made of the metal material in the prior not only has high cost, but also has limited heat dissipation efficiency, so as to affect the operation efficiency of the motor, the stability and service life of the product. Accordingly, there is a need of providing a motor to obviate the drawbacks encountered from the prior arts.

SUMMARY OF THE INVENTION

It is an object of the present disclosure to provide a motor. The motor includes a rotor and a stator. By arranging double rows of perforated holes on the hub of the impeller of the rotor, airflows can be effectively guided into the bearing assembly and the windings. Consequently, the efficacy of enhancing heat dissipation efficiency, dustproof and cost down can be achieved.

It is another object of the present disclosure to provide a motor. The motor includes a rotor and a stator. By arranging double rows of perforated holes and a plurality of guiding blades on the hub of the impeller of the rotor, airflows can be effectively guided into the bearing assembly and the windings through the double rows of through holes by the guiding of the guiding blades. Consequently, the efficacy of enhancing heat dissipation efficiency, dustproof, cost down and increasing the product stability and reliability can be achieved.

In accordance with an aspect of the present disclosure, there is provided a motor including a rotor and a stator. The rotor at least comprises a rotating shaft and an impeller. The impeller couples with the rotating shaft and has a hub. The hub has an outer surface, an inner surface, a plurality of first through holes and a plurality of second through holes. The plurality of first through holes are disposed nearer the rotating shaft than the plurality of second through holes. The plurality of first through holes and the plurality of second through holes penetrate the outer surface and the inner surface. The stator at least comprises a silicon steel sheet and a bearing assembly. The silicon steel sheet has an annular portion and a plurality of protruding portions. The rotating shaft couples with the bearing assembly and penetrates within an inner hole of the annular portion. The plurality of protruding portions are extended outward from the annular portion and have an extending length. The distance between each the first through hole and the nearest second through hole is in a range of 0.3 to 1.2 times of the extending length.

In an embodiment, the outer surface has an included angle with a horizontal line, and the included angle is between 3 to 30 degrees.

In an embodiment, an axial projection position of the edge of each first through hole farthest from a center of the rotating shaft is within a range of ⅓ of the extending length of the protruding portion extending outward from the annular portion.

In an embodiment, an axial projection position of the edge of each second through hole closest to a center of the rotating shaft is outside a range of ⅔ of the extending length of the protruding portion extending outward from the annular portion.

In an embodiment, the hub further comprises a plurality of guiding blades, and the plurality of guiding blades are disposed on the outer surface or the inner surface, or both of the outer surface and the inner surface.

In an embodiment, the plurality of first through holes and the plurality of second through holes are correspondingly arranged in front of a windward side of the plurality of guiding blades.

In an embodiment, each of the plurality of guiding blades has a head end and a terminal end, a virtual straight line is formed by a middle point of the head end connected to a middle point of the terminal end, and the length of the virtual straight line is a guiding blade chord length, wherein the shortest distance between a center point of the nearest first through hole and the virtual straight line is not greater than 0.4 times of the guiding blade chord length, and the shortest distance between a center point of the nearest second through hole and the virtual straight line is not greater than 0.4 times of the guiding blade chord length.

In accordance with another aspect of the present disclosure, there is provided a motor including a rotor and a stator. The rotor at least comprises a rotating shaft and an impeller. The impeller couples with the rotating shaft and has a hub. The hub has an outer surface, an inner surface, a plurality of first through holes, a plurality of second through holes and a plurality of guiding blades. The plurality of first through holes are disposed nearer the rotating shaft than the plurality of second through holes. Each of the plurality of guiding blades has a head end and a terminal end. The head end is far away from the rotating shaft, and the terminal end is close to the rotating shaft. The stator is arranged corresponding to the rotor. A virtual straight line is formed by a middle point of the head end connected to a middle point of the terminal end. The length of the virtual straight line is a guiding blade chord length. The shortest distance between a center point of the nearest first through hole and the virtual straight line is not greater than 0.4 times of the guiding blade chord length. The shortest distance between a center point of the nearest second through hole and the virtual straight line is not greater than 0.4 times of the guiding blade chord length.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
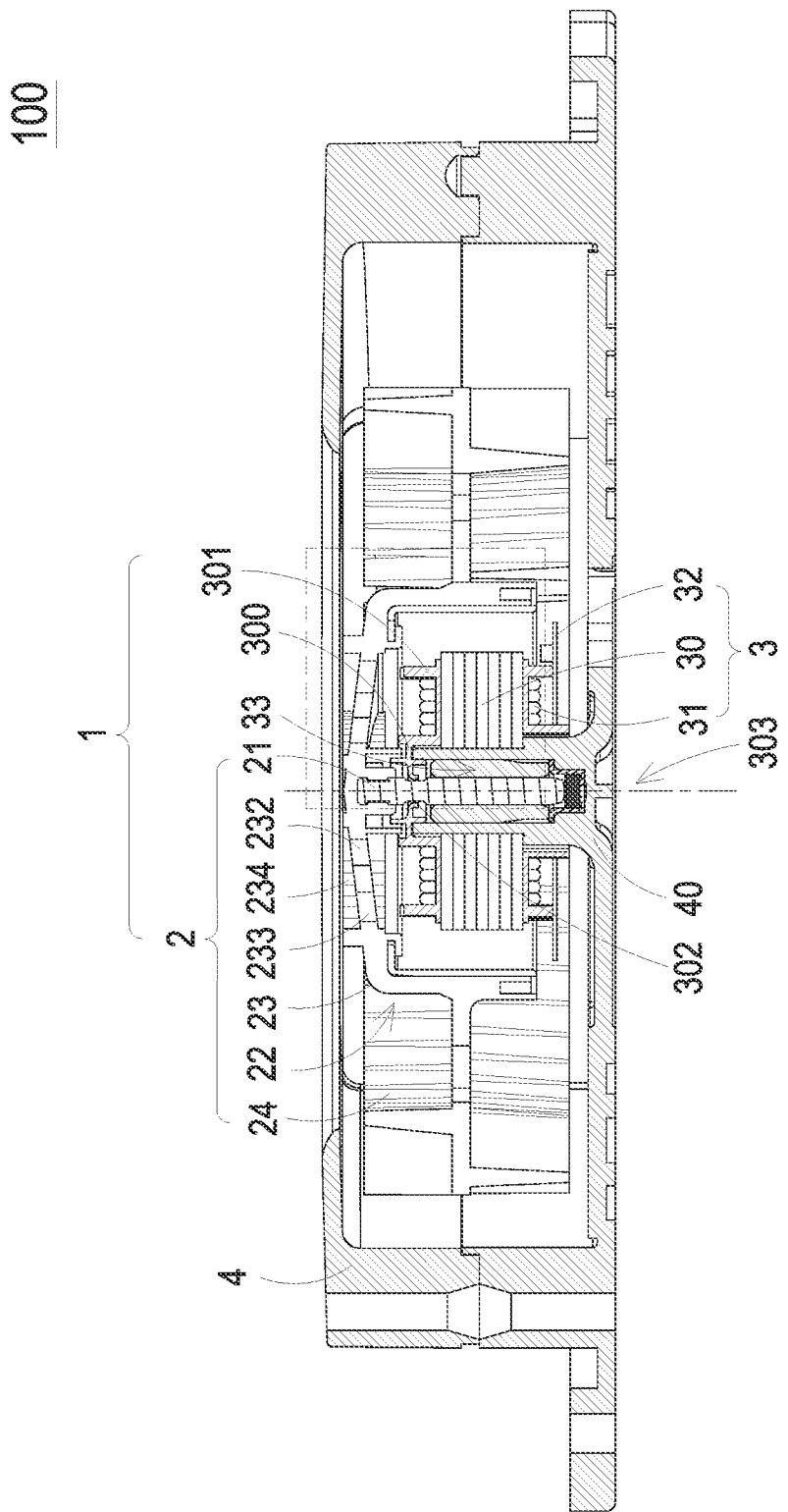
FIG. 1 is a cross-sectional view illustrating a fan and a motor thereof according to an embodiment of the present disclosure.
Figure 2:
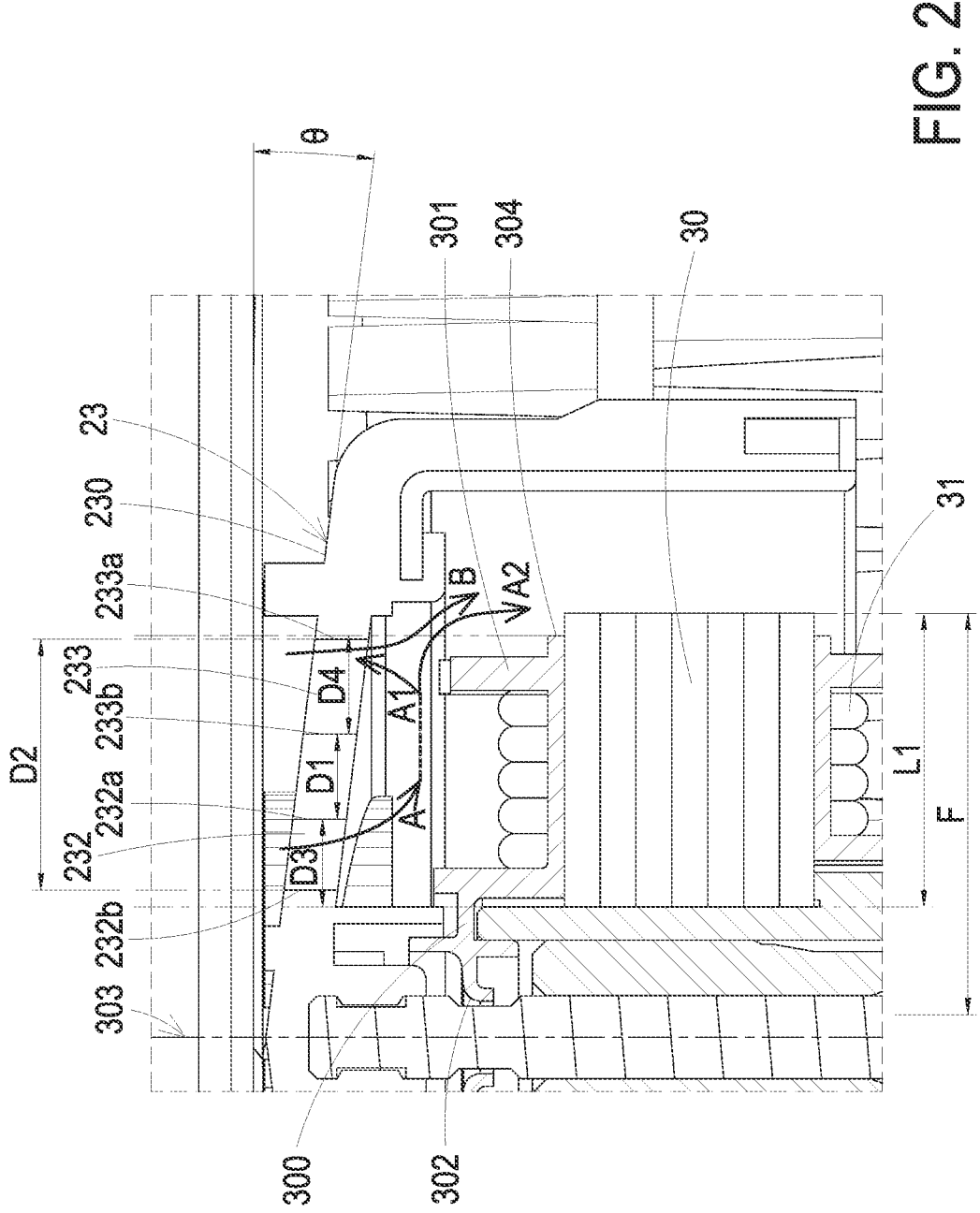
FIG. 2 is a partial enlargement schematic view illustrating the motor of FIG. 1.
Figure 5:
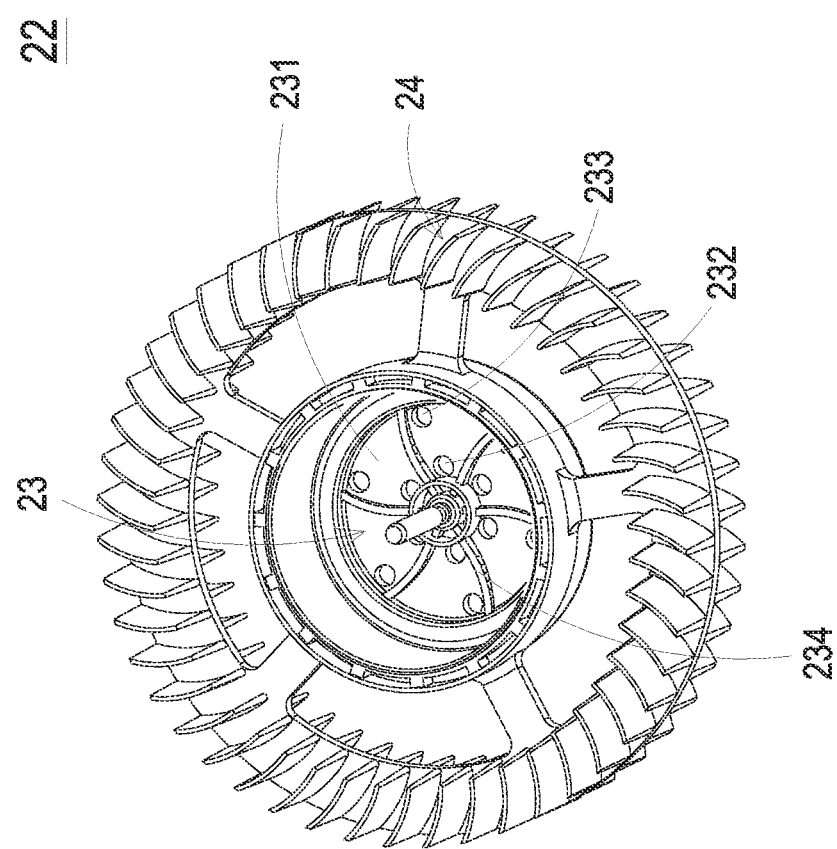
FIG. 5 is a schematic perspective view illustrating the impeller of the motor of FIG. 4 and taken along another viewpoint.

FIG. 1 is a cross-sectional view illustrating a fan and a motor thereof according to an embodiment of the present disclosure. FIG. 2 is a partial enlargement schematic view illustrating the motor of FIG. 1. As shown in FIG. 1, the motor 1 of the present disclosure is preferably applied to an external-rotor motor and assembled in the fan frame 4, so as to form a fan 100, but not limited to. In the embodiment, the motor 1 includes a rotor 2 and a stator 3. The rotor 2 at least comprises a rotating shaft 21 and an impeller 22. The impeller 22 couples with the rotating shaft 21 and has a hub 23. The hub 23 has an outer surface 230, an inner surface 231 (as shown in FIG. 5), a plurality of first through holes 232 and a plurality of second through holes 233. The first through holes 232 are disposed nearer the rotating shaft 21 than the second through holes 233. The plurality of first through holes 232 and the plurality of second through holes 233 penetrate the outer surface 230 and the inner surface 231. The stator 3 at least comprises a silicon steel sheet 30 and a bearing assembly 33. The silicon steel sheet 30 has an annular portion 300 and a plurality of protruding portions 301. The rotating shaft 21 couples with the bearing assembly 33 and penetrates within an inner hole 302 of the annular portion 301. Each protruding portion 301 is extended outward from the annular portion 300 and has an extending length L1. The distance between each plurality of first through hole 232 and the nearest second through hole 233 is in a range of 0.3 to 1.2 times of the extending length L1.

Please refer to FIG. 1 again. As shown in FIG. 1, the impeller 22 further has a plurality of blades 24. The stator 3 also includes windings 31 and a circuit board 32, wherein the windings 31 are wound on the silicon steel sheet 30 and assembled with the circuit board 32, so as to form the stator 3 of the present disclosure. As mentioned above, the rotating shaft 21 penetrates within an inner hole 302 of the annular portion 301, so that the rotor 2 and the stator 3 are assembled correspondingly, and the motor 1 of the present disclosure is formed. By assembling the bearing assembly 33 on a base 40, the motor 1 can be assembled within the fan frame 40, so as to complete the assembly of the fan 100.

Figure 3:
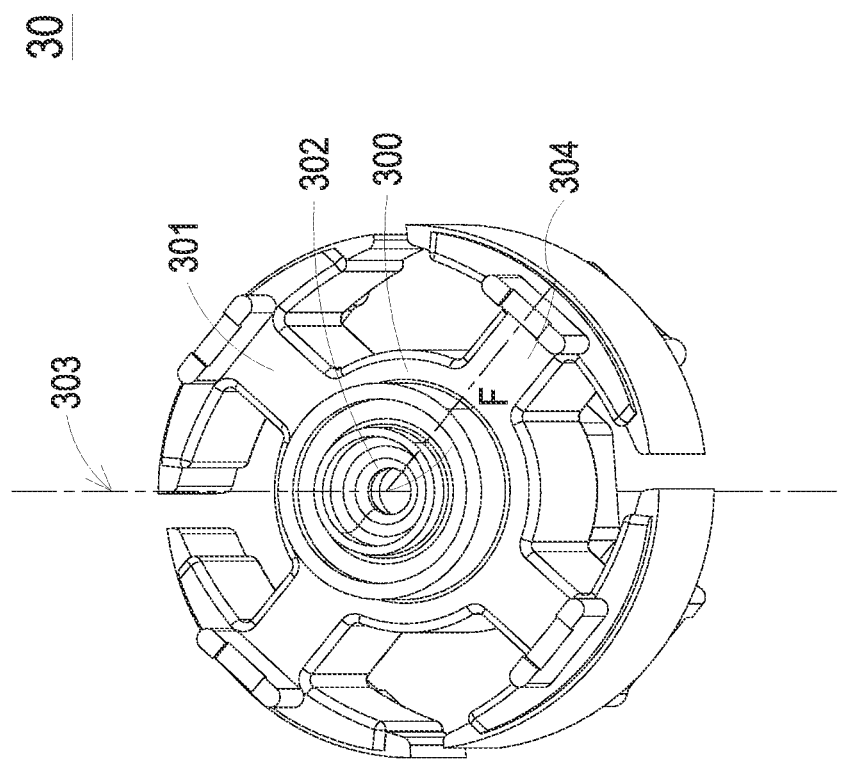
FIG. 3 is a schematic perspective view illustrating a silicon steel sheet of the motor of FIG. 1.

Please refer to FIG. 2 and FIG. 3. FIG. 3 is a schematic perspective view illustrating a silicon steel sheet of the motor of FIG. 1. The silicon steel sheet 30 has an annular portion 300 and a plurality of protruding portions 301. The plurality of protruding portions 301 are extended outward from the annular portion 300. In the embodiment, the silicon steel sheet 30 further comprises an inner hole 302, the inner hole 302 is arranged in the center of the annular portion 300. There is a central axis 303 of the silicon steel sheet 30, which also corresponds to the central position of the inner hole 302. As shown in FIG. 3, each protruding portions 301 has a farthest end 304 remote from the central axis 303. A straight line F is formed by connecting any one of the farthest ends 304 of the plurality of protruding portions 301 to the central axis 303 of the silicon steel sheet 30. Please refer to FIG. 2 and FIG. 3 at the same time, the projected length of the protruding portion 301 on the straight line F is the extending length L1. The positions of the first through hole 232 and the second through hole 233 relative to the protruding portion 301 of the silicon steel sheet 30 can be seen in FIG. 2, and these configurations are used for quickly taking away the heat generated by the windings 31 during the operation of the motor 1.

In this embodiment, each first through hole 232 has a farthest point 232a and a nearest point 232b from the center of the rotating shaft 21. Similar, each second through hole 233 also has a farthest point 233a and a nearest point 233b from the center of the rotating shaft 21. Consequently, the shortest distance D1 between the first through hole 232 and the second through hole 233 is the distance from the farthest point 232a of the first through hole 232 to the nearest point 233b of the second through hole 233. In the embodiment, the length of the shortest distance D1 is not smaller than 0.3 times of the extending length L1. In addition, the longest distance D2 between the first through hole 232 and the second through hole 233 is the distance from the nearest point 232b of the first through hole 232 to the farthest point 233a of the second through hole 233. In the embodiment, the length of the longest distance D2 is not greater than 1.2 times of the extending length L1. In other words, in this embodiment, the distance between any one of the plurality of first through holes 232 and the nearest second through hole 233 is in a range of 0.3 to 1.2 times of the extending length L1, so as to achieve better heat dissipating efficiency. In other embodiments, the length of the longest distance D2 can be greater than the length of the protruding portions 301 of the silicon steel sheet 30, and the length may even cover all the windings 31 of the silicon steel sheet 30, but not limited thereto.

Moreover, as shown in FIG. 2, in the present disclosure, an axial projection position of the edge of any one of the plurality of first through holes 232 farthest from a center of the rotating shaft 21 is within a range of ⅓ of the extending length L1, which is in the range of ⅓ of the protruding portions 301 of the silicon steel sheet 30 extended outward from the annular portion 300. In other words, the distance D3 is in the range of ⅓ of the extending length L1 near the annular portion 300. Furthermore, an axial projection position of the edge of any one of the plurality of second through hole 233 closest to the center of the rotating shaft 21 is outside a range of 2/3 of the extending length L1 of the protruding portions 301 extending outward from the annular portion 300. Namely, the distance D4 is beyond the range of 2/3 of the extending length L1 away from the annular portion 300, but not limited thereto. Through the above configurations of the corresponding positions of the first through holes 232 and the second through holes 233, the range of these through holes can corresponding cover both sides of the windings 31. Consequently, airflows can be guided into the motor 1 through the plurality of first through holes 232, which can flow as shown by the arrow A in FIG. 2, so as to dissipate heat from the windings 31. At this time, a part of airflows A may escape from the plurality of second through holes 233 as shown by the arrow A1 in FIG. 2, the other airflows A will flows downward as shown by the arrow A2 in FIG. 2, so as to remove the heat generated from the windings 31. Meanwhile, airflows B may also be introduced from the plurality of second through holes 233, so as to dissipate heat from the windings 31. Consequently, through the design of these double rows of through holes, the convection heat dissipation can be enhanced, which not only can effectively reduce the temperature of the winding 31, but also reduce the working temperature of the bearing assembly 33. In addition, due to the rapid convection of these airflows, it can also assist in spraying away the dust in the motor 1, which is beneficial to dust prevention.

Please refer to FIG. 2 again. In some embodiments, the hub 23 of the impeller 22 is an inclined slope, and the outer surface 230 has an included angle θ with the horizontal line, but not limited to. Take this embodiment as an example, the included angle θ is between 3 to 30 degrees, but not limited thereto. Through this inclined hub 23, the heat dissipating airflows can be effectively introduced into the bearing assembly 33 and the windings 31, so as to facilitate heat dissipation.

Figure 4:
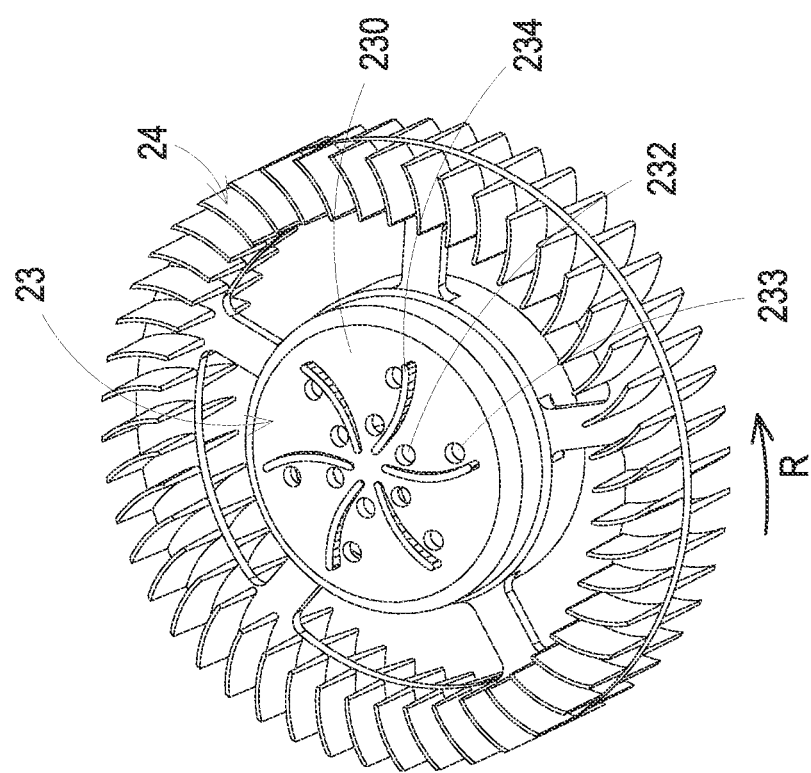
FIG. 4 is a schematic perspective view illustrating an impeller of the motor of FIG. 1.

Please refer to FIG. 4 and FIG. 5 at the same time. FIG. 4 is a schematic perspective view illustrating an impeller of the motor of FIG. 1. FIG. 5 is a schematic perspective view illustrating the impeller of the motor of FIG. 4 and taken along another viewpoint. As shown in FIG. 4, in this embodiment, the impeller 22 has a hub 23 and a plurality of blades 24, the plurality of blades 24 are arranged around the hub 23. The hub 23 further includes a plurality of guiding blades 234. Take this embodiment as an example, the impeller 22 and the hub 23 may be but not limited to be made of plastic materials. In this embodiment, the plurality of first through holes 232, the plurality of second through holes 233, and the plurality of guiding blades 234 of the hub 23 can be made by the injection molding procedures, but not limited thereto. Accordingly, the cost of the hub 23 can be reduced. As shown in FIG. 4 and FIG. 5, the hub 23 has an outer surface 230 and an inner surface 231, the inner surface 231 corresponds to the outer surface 230. The plurality of first through holes 232 and the plurality of second through holes 233 penetrate the outer surface 230 and the inner surface 231, respectively. In some embodiments, the plurality of guiding blades 234 are respectively disposed on the outer surface 230 and the inner surface 231 of the hub 23, but not limited thereto. In other embodiments, the plurality of guiding blades 234 can be only disposed on the outer surface 230 or the inner surface 231, but the number and the arrangement may be varied according to the practical requirements. As shown in FIG. 4, the plurality of first through holes 232 are disposed nearer the center of the hub 23, and are arranged in a first annular pattern. The plurality of second through holes 233 are disposed away from the center of the hub 23, and are arranged in a second annular pattern, but not limited thereto. Besides, the diameter of the first annular pattern is smaller than the diameter of the second annular pattern.

Please refer to FIG. 4 again. In this embodiment, the hub 23 further includes a plurality of guiding blades 234. In some embodiments, the plurality of guiding blades 234 may be only disposed on the outer surface 230. In other embodiments, the plurality of guiding blades 234 may be respectively disposed on the outer surface 230 and the inner surface 231. For example, in this embodiment, the plurality of guiding blades 234 are respectively disposed on the outer surface 230 and the inner surface 231 of the hub 23, and each guiding blade 234 is an arc-shaped rib with a height, but not limited thereto. The type, the appearance, the number and the arrangement of the guiding blades 234 may be varied according to the practical requirements. In this embodiment, the plurality of first through holes 232 and the plurality of second through holes 233 are correspondingly arranged in a windward side of the plurality of guiding blades 234. Namely, it corresponds to the rotating direction R of the impeller 22. In other words, the plurality of first through holes 232 and the plurality of second through holes 233 are correspondingly arranged in front of the plurality of guiding blades 234. Consequently, when the impeller 22 rotates, the guiding blades 234 can guide the airflows into the plurality of first through holes 232 and the plurality of second through holes 233 in the front side of the guiding blades 234, so as to enhance the convection heat dissipation.

Figure 6:
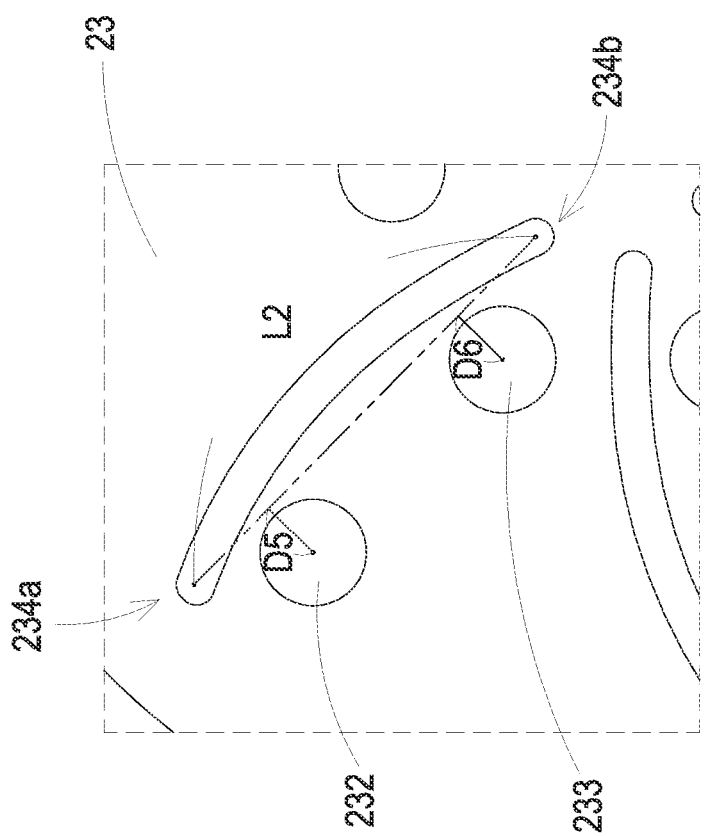
FIG. 6 is a partial enlargement top view illustrating a hub of the impeller of FIG. 4.

Please refer to FIG. 6. FIG. 6 is a partial enlargement top view illustrating a hub of the impeller of FIG. 4. As shown in FIG. 6, in the embodiment, each guiding blade 234 is a guiding structure with an arc, but not limited to. Each guiding blade 234 has a head end 234a and a terminal end 234b disposed opposite to each other. A virtual straight line is formed by a middle point of the head end 234a connected to a middle point of the terminal end 234b, and the length of the virtual straight line is a guiding blade chord length L2. Wherein, the shortest distance between the center point of the first through hole 232 closest to the guiding blade 234 and the virtual straight line is a first length D5. In this embodiment, the first length D5 is not greater than 0.4 times of the guiding blade chord length L2. Moreover, the shortest distance between the center point of the second through hole 233 closest to the guiding blade 234 and the virtual straight line is a second length D6. Similar, the second length D6 is not greater than 0.4 times of the guiding blade chord length L2. It is worth noting that, although in this embodiment, the first length D5 and the second length D6 between the first through hole 232, the second through hole 233 and the guiding blade chord length L2 are not greater than 0.4 times of the guiding blade chord length L2, this doesn't mean that the first length D5 and the second length D6 are the same, and they can be different lengths. In other words, the distance between the first through hole 232, the second through hole 233 and the guiding blade chord length L2 may be different, which may be varied according to the practical requirements. While, the length of this distance is for the guiding blade 234 to help guide airflows into the first through hole 232 and the second through hole 233 in the front side thereof, so as to effectively assist in the convection heat dissipation.

Please refer to the table 1 listed below. Table 1 is a comparison table of the heat dissipation test performed under the same conditions between the embodiment of the present disclosure and two prior arts. In the prior art 1, the hub of the motor has no through holes. When it operates for a certain period of time, the temperature of the bearing assembly is measured as 56.7° C. and the temperature of the winding is 93.4° C. By comparing with the present disclosure, the motor 1 of the present disclosure was tested after operating for the same period time, and the measured temperature of the bearing assembly 20 was 38.8° C., the temperature of the winding 31 was 71.9° C. It is cleared that the temperature of the bearing assembly of the present disclosure is greatly reduced by 17.9° C. than the prior art 1, and the temperature of the winding of the present disclosure is also greatly reduced by 21.5° C. than the prior art 1. Consequently, through the design of the double rows of through holes of the present disclosure, the convection heat dissipation can be enhanced, which can effectively reduce the temperature of the bearing assembly and the windings. In addition, in the prior art 2, the hub of the motor has only one row of through holes, and the temperature of the bearing assembly is measured as 48.8° C. and the temperature of the winding is 75.4° C. Even the hub of the prior art 2 already has one row of through holes to assist heat dissipation, while the double rows of through holes of the present disclosure is still greatly reduced the temperature of the bearing assembly and the windings than the prior art 2, and is reduced by 10° C. and 3.5° C., respectively. Consequently, in the embodiment of the present disclosure, airflows can be effectively introduced into the bearing assembly and the windings to achieve the efficacy of heat dissipation. Since the heat dissipation effect of the embodiment of the present disclosure is remarkable, the product life can also be greatly increased. Namely, the expected time when the product has a 10% defect (i.e., the expected product life value L10) can be increased by 2 times to 3 times compared with the prior art 1. Consequently, the efficacy of increasing the reliability of the product and product life are achieved.

TABLE 1

|  | Temperature of bearing assembly | Reduced temperature (in comparison with prior arts) | Temperature of windings | Reduced temperature (in comparison with prior arts) |
|---|---|---|---|---|
| Prior art 1 | 56.7° C. | 17.9° C. | 93.4° C. | 21.5° C. |
| Prior art 2 | 48.8° C. | 10° C. | 75.4° C. | 3.5° C. |
| Embodiment of the present disclosure | 38.8° C. | — | 71.9° C. | — |

From the above descriptions, the present disclosure provides a motor. The motor includes a rotor and a stator. By arranging double rows of perforated holes and a plurality of guiding blades on the hub of the impeller of the rotor, and cooperating with the features such as the shortest distance and the longest distance between the double rows of through holes, the length of the double rows of through holes relative to the length of the silicon steel sheet and the distance relative to the guiding blades, the angle of the inclined slope of the hub, the double rows of through holes arranged in front of the guiding blades, etc., airflows can be effectively guided into the bearing assembly and the windings through the double rows of through holes by the guiding of the guiding blades. Consequently, the efficacy of enhancing heat dissipation efficiency, dustproof, cost down and increasing the product stability and reliability can be achieved.

While the disclosure has been described in terms of what is presently considered to be the most practical and preferred embodiments, it is to be understood that the disclosure needs not be limited to the disclosed embodiment.

What is claimed is:

1. A motor, comprising:
   a rotor at least comprising a rotating shaft and an impeller, wherein the impeller couples with the rotating shaft and has a hub, the hub has an outer surface, an inner surface, a plurality of first through holes and a plurality of second through holes, the plurality of first through holes are disposed nearer the rotating shaft than the plurality of second through holes, and the plurality of first through holes and the plurality of second through holes penetrate the outer surface and the inner surface; and
   a stator at least comprising a silicon steel sheet and a bearing assembly, wherein the silicon steel sheet has an annular portion and a plurality of protruding portions, the rotating shaft couples with the bearing assembly and penetrates within an inner hole of the annular portion, and the plurality of protruding portions are extended outward from the annular portion and have an extending length;
   wherein the distance between each the first through hole and the nearest second through hole is in a range of 0.3 to 1.2 times of the extending length.

2. The motor according to claim 1, wherein the outer surface has an included angle with a horizontal line, and the included angle is between 3 to 30 degrees.

3. The motor according to claim 1, wherein an axial projection position of the edge of each first through hole farthest from a center of the rotating shaft is no longer than ⅓ of the extending length extending outward from the annular portion to the protruding portion.

4. The motor according to claim 1, wherein an axial projection position of the edge of each second through hole closest to a center of the rotating shaft is beyond ⅔ of the extending length extending outward from the annular portion to the protruding portion.

5. The motor according to claim 1, wherein the hub further comprises a plurality of guiding blades, and the plurality of guiding blades are disposed on the outer surface or the inner surface, or both of the outer surface and the inner surface.

6. The motor according to claim 5, wherein the plurality of first through holes and the plurality of second through holes are correspondingly arranged in front of a windward side of the plurality of guiding blades.

7. The motor according to claim 5, wherein each of the plurality of guiding blades has a head end and a terminal end, a virtual straight line is formed by a middle point of the head end connected to a middle point of the terminal end, and the length of the virtual straight line is a guiding blade chord length, wherein the shortest distance between a center point of the nearest first through hole and the virtual straight line is not greater than 0.4 times of the guiding blade chord length, and the shortest distance between a center point of the nearest second through hole and the virtual straight line is not greater than 0.4 times of the guiding blade chord length.

8. A motor, comprising:
a rotor at least comprising a rotating shaft and an impeller, wherein the impeller couples with the rotating shaft and has a hub, the hub has an outer surface, an inner surface, a plurality of first through holes, a plurality of second through holes and a plurality of guiding blades, the plurality of first through holes are disposed nearer the rotating shaft than the plurality of second through holes, and each of the plurality of guiding blades has a head end and a terminal end, the head end is far away from the rotating shaft, and the terminal end is close to the rotating shaft; and
a stator arranged corresponding to the rotor;
wherein a virtual straight line is formed by a middle point of the head end connected to a middle point of the terminal end, and the length of the virtual straight line is a guiding blade chord length, and
wherein the shortest distance between a center point of the nearest first through hole and the virtual straight line is not greater than 0.4 times of the guiding blade chord length, and the shortest distance between a center point of the nearest second through hole and the virtual straight line is not greater than 0.4 times of the guiding blade chord length.

9. The motor according to claim 8, wherein the outer surface has an included angle with a horizontal line, and the included angle is between 3 to 30 degrees.

10. The motor according to claim 8, wherein the plurality of guiding blades are disposed on the outer surface or the inner surface.

11. The motor according to claim 8, wherein the plurality of first through holes and the plurality of second through holes are correspondingly arranged in front of a windward side of the plurality of guiding blades.

12. The motor according to claim 8, wherein the stator further comprises a silicon steel sheet, the silicon steel sheet has an annular portion and a plurality of protruding portions, and the rotating shaft penetrates within an inner hole of the annular portion, and the plurality of protruding portions are extended from the annular portion and have an extending length, wherein the distance between each the first through hole and the nearest second through hole is in a range of 0.3 to 1.2 times of the extending length.

13. The motor according to claim 12, wherein an axial projection position of the edge of each first through hole farthest from a center of the rotating shaft is no longer than $\frac{1}{3}$ of the extending length extending outward from the annular portion to the protruding portion.

14. The motor according to claim 12, wherein an axial projection position of the edge of each second through hole closest to a center of the rotating shaft is beyond $\frac{2}{3}$ of the extending length extending outward from the annular portion to the protruding portion.

* * * * *